US00RE34612E

United States Patent [19]

Bender et al.

[11] E Patent Number: Re. 34,612

[45] Reissued Date of Patent: May 24, 1994

[54] INDEXING RELOADER OF CARTRIDGES

[75] Inventors: Walter W. Bender; Charles A. Gaustad, both of Oroville, Calif.

[73] Assignee: Blount, Inc., Portland, Oreg.

[21] Appl. No.: 533,527

[22] Filed: Jun. 5, 1990

Related U.S. Patent Documents

Reissue of:

[64] Patent No.: 4,841,831
Issued: Jun. 27, 1989
Appl. No.: 261,273
Filed: Oct. 24, 1988

[51] Int. Cl.[5] ..... F42B 33/02

[52] U.S. Cl. ..... 86/27; 86/25; 29/785; 29/48.5 R; 74/817

[58] Field of Search ..... 86/23, 24, 25, 27, 28, 86/45; 714/813 R, 813 C, 817, 816; 29/785, 43, 44, 45, 48.5 A, 48.5 R

[56] References Cited

U.S. PATENT DOCUMENTS

| | | | |
|---|---|---|---|
| 2,854,861 | 10/1958 | Loder | 74/817 |
| 2,967,440 | 1/1961 | Hunter | 74/817 |
| 3,157,086 | 11/1964 | Bachhuber | 86/27 |
| 3,771,411 | 11/1973 | Hazel | 86/27 |
| 4,031,804 | 6/1977 | Boschi | 86/23 |
| 4,163,410 | 8/1979 | Dillon | 86/23 |
| 4,287,748 | 9/1981 | Wolfthal | 74/817 |
| 4,343,222 | 8/1982 | Dillon | 86/27 |
| 4,393,744 | 7/1983 | Lee | 86/25 |
| 4,515,063 | 5/1985 | Lee | 86/27 |
| 4,526,084 | 7/1985 | David et al. | 86/24 |
| 4,817,491 | 4/1989 | Fenton | 86/23 |

*Primary Examiner*—Stephen Johnson
*Attorney, Agent, or Firm*—Robert L. Harrington

[57] ABSTRACT

A reloader for reloading cartridges. A reciprocating plunger carries a turret that rotates around the axis of the plunger. The turret carries a plurality of cartridges for reloading, the cartridges being symmetrically spaced around the turret axis and adapted to be indexed around the axis in a step-by-step sequence. An overhead die holder contains a plurality of dies spaced in a symmetrical pattern similar to that of the cartridges but in fixed positions. A center opening the die holder houses a rotatable bushing. The rotation of the bushing is controlled in part by a one-way clutch. An indexing shaft affixed to the turret extends from the turret axis through the bushing. The shaft has a multi-sided cross section and is slidably fitted to the bushing in a manner that prevents relative rotation. The configured cross section has an axial twist and when forced through the bushing by the reciprocating plunger, causes turning of one or the other of the shaft and turret or the bushing. A secondary invention is the adaptation of this concept to a conventional single stage reloader.

13 Claims, 2 Drawing Sheets

INDEXING RELOADER OF CARTRIDGES

Matter enclosed in heavy brackets [ ] appears in the original patent but forms no part of this reissue specification; matter printed in italics indicates the additions made by reissue.

FIELD OF INVENTION

This invention relates to reloading presses used to reload spent cartridge cases and more particularly to presses having multiple reloading stations with indexing means for automatically indexing cartridges through the stations.

BACKGROUND OF THE INVENTION

It is very common for active shooters of hand guns and rifles to reload their spent cartridges. A cartridge that is purchased new can be repeatedly fired and reloaded, e.g. commonly five or six times, before the case is considered to be non-reloadable. The savings to the shooter can be substantial and just as important to many hobbyists, the cartridges can be custom tailored to fit the shooter's concept of the ideal cartridge case for his particular event.

The operations to be performed on a cartridge for reloading are numerous. The spent primer cap must be removed, the case must be resized, a new primer cap and powder must be inserted, a bullet must be seated in the casing's mouth and the casing mouth needs to be crimped. Certain combinations of these operations may be accomplished by a single die but, in any event, between four and six reloading dies are employed with the corresponding four or six reloading steps to be performed. For each step, a cartridge case is seated on a reloading ram or plunger and the case is forced by the plunger into or onto an appropriate die.

Typically a single station reloading tool includes a fixture that is secured to a workbench. The fixture includes a guide for the plunger and mechanism for manually moving the plunger up and down in the guide. The top of the plunger is designed to receive a cartridge case. The fixture also includes a die holding plate aligned above the plunger. Various dies are adapted for sequential interchangeable mounting in the die holding plate. The cartridges are individually positioned on the plunger and pressed into the first die. The die is replaced and the process repeated as many times as required for completion of the reloading process.

The present invention is directed to a modification of the single station reloading tool. By positioning dies in a circular pattern to form multiple stations, and then loading cartridge cases in sequence on an indexable rotatable turret, the cartridge cases can be moved in sequence through the multiple stations. For example, if there are four reloading stations, the first cartridge case is placed on the turret and the plunger activated to perform the first step. The turret is then indexed to place the cartridge in line with the next die station and a second cartridge is placed on the turret in line with the first die station. The plunger is activated to accomplish two independent reloading die functions. Third and fourth cartridges are added in sequence until four reloading steps are simultaneously performed on different cartridges. Thereafter a completed reloaded cartridge is removed and a new cartridge added to the turret in its place so that each plunger action performs four reloading steps on four separate cartridges.

The above broad concept of multi-station reloading is not new to this invention. Assignee of the present application developed a multi-station cartridge reloading tool wherein the rotatable turret is indexed manually. The present invention is, however, more specifically to a tool having the feature of automatic indexing of the turret which is broadly stated also is not unique to this invention as evidenced by U.S. Pat. No. 4,515,063, issued to Richard J. Lee. Lee provides an indexing turret carried by a plunger. Indexing is achieved by an indexing shaft that is projected through the center of the turret. The turret slides up and down on the shaft but is rotatably fixed to the shaft. The turret is rotatable relative to the plunger. A clutch mechanism has one component fixed to the plunger and rides up and down with the plunger but not engaged with the shaft. A second component of the clutch mechanism rise on a guide surface of the shaft and is engaged with the first component in downward movement of the plunger and is disengaged in the upward movement. The guide surface on the shaft has a spiral section. The second component of the clutch mechanism is guided over the spiral section in both the upward and downward movement of the plunger. Indexing of the turret does not take place in the plunger's upward movement because the clutch components are disengagd. In the downward movement, the engaged clutch components are engaged and force turning of the shaft and thus indexing of the turret.

BRIEF SUMMARY OF THE INVENTION

The present invention is an improvement over the Lee concept of indexing a reloader for cartridges. An indexing shaft is fixed to the center of the turret. The turret is rotatably mounted centrally on the plunger. Thus, as the plunger moves up and down, the turret and indexing shaft are also moved up and down. The shaft is projected upwardly through a bushing that is rotatable in the die holder in one direction only. A portion of the shaft that is projected up and down through the bushing has a spiral guide surface that forces turning of the bushing relative to the shaft. As the shaft is moved upwardly through the bushing, the bushing rotates and the shaft is simply passed, without rotation, through the die holder. In the return movement, the bushing is prevented from turning and the shaft is forced to turn.

The device of the present invention as compared to the Lee device is simpler in design, more reliable in operation, and permits the force of the plunger to be applied centrally on the turret. Furthermore, the invention lends itself to being retrofit onto existing one-step or one-station reloaders.

These advantage and others will become apparent on reference to the following detailed descriptions and drawings wherein.

Figure 3:
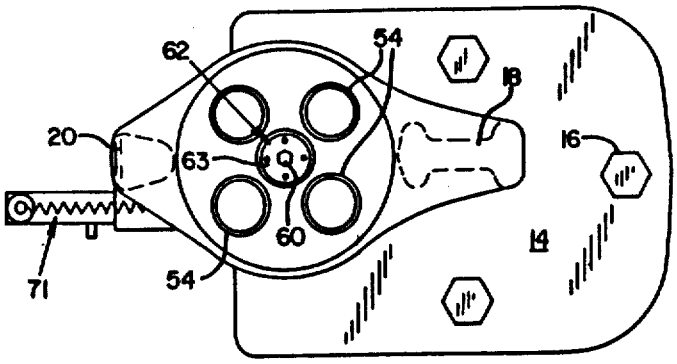
FIG. 3 is a top view of the device of FIG. 1.
Figure 2:
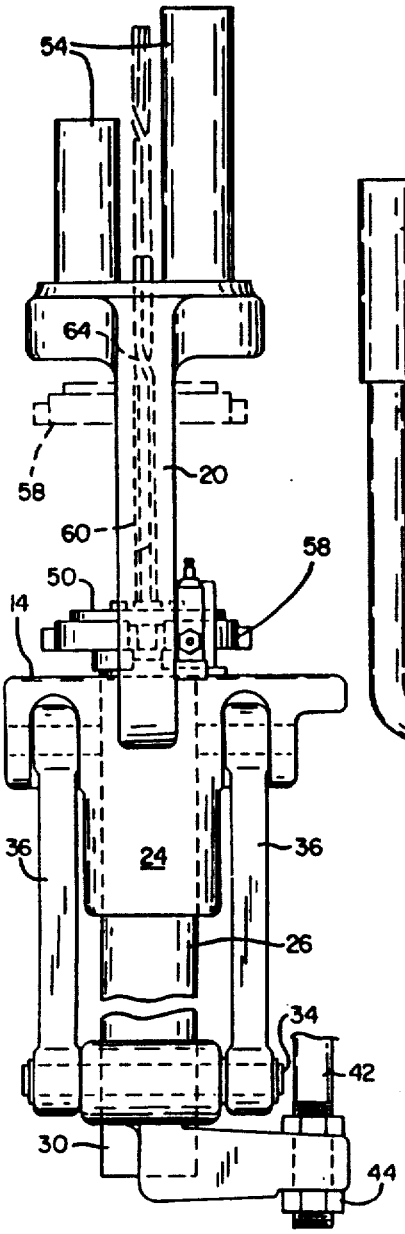
FIG. 2 is a front view of the device of FIG. 1.
Figure 1:
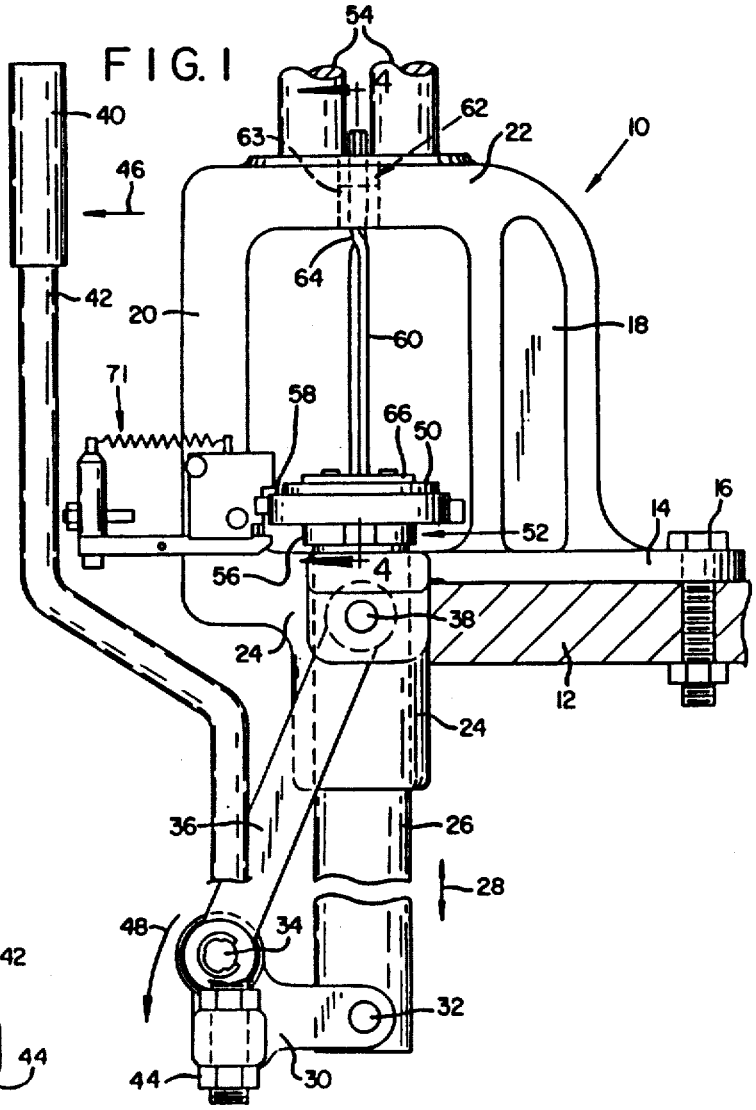
FIG. 1 is a side view of an indexing reloader device in accordance with the present invention.

Reference is made to FIGS. 1 and 2 illustrating a cartridge reloading device 10. Bolts 16 are projected through a flange 14 in the support structure of the reloading device to securely mount the device to a table 12. The support structure, in addition to the flange 14 and integral therewith, includes support posts 18 and 20 supporting an overhead die holder 22, and a plunger guide 24 depending from flange 14. A plunger 26 is guided for vertical, reciprocal sliding movement through the guide 24 as indicated by arrow 28. A pivotal bracket 30 is L-shaped as illustrated, with one end pivotally attached at pivot 32 to the bottom of plunger 26 and the other end pivotally attached at pivot 34 to one end of arm 36. The other end of the arm 26 is pivotally attached at pivot 38 to the support structure, i.e. the plunger guide 24 and flange 14.

A handle 40 having an elongated handle bar 42 is attached to the pivotal bracket 30 as indicated by the dash lines. The handle bar 42 is projected through the pivotal bracket 30 and with a nut 44 screwed onto the protruded end thereof. Pulling the handle as indicated by arrow 46 forces rotation of the pivotal bracket 30 about pivot 34 as indicated by arrow 48, which in turn forces upper movement of the plunger 26.

The present invention, directed to automatic indexing of the turret, is particularly unique as compared to the prior art Lee device in its adaptability to the basic structure of the single station reloader. The cartridge holder of the single station reloader is replaced with a rotatable turret 50 having provision for holding a plurality of cartridges in a circular pattern symmetrically positioned around the axis of rotation and generally on the axis of the plunger 26.

In the present device, a mounting mechanism 52 for mounting the turret 50 to the plunger 26 provides for rotative movement of the turret 50 relative to the plunger 26. The die holder 22 is provided with a plurality of dies 54 arranged in the same circular, symmetrical pattern as the cartridges in the turret 50. The two circular patterns are in line with the plunger movement so that the turret can be rotated to place the cartridges in line with the dies. This is not unlike the common assignee's multistation reloader but that reloader does not have automatic indexing of the turret as will be now explained.

It will be appreciated that the concept of multi-station reloading is that all of the reloading operations that previously were accomplished with a single stage reloader but using a sequence of replaceable dies, can be accomplished in a single pressing operation. However, each cartridge must still go through the multiple pressing stages, and as concerns each cartridge, the press must be operated the same number of times. The advantages resides in the fact that four different functions are being performed on four different cartridges with a single stroke of the reloader.

Referring now specifically to the apparatus of embodiment of FIG. 1, four dies 54 are provided in the die holder 22 and thus for the reloading operation to which the reloader 10 is being applied, four pressing stages are required to complete reloading of cartridges 53. In general and as previously explained, a cartridge is placed in the turret under the first die and the press is operated to perform the first die operation. A cartridge is indexed over to the second die position and the second die operation is accomplished. (Mechanism 71, as shown in the drawings, functions to set a primer in the cartridge between the first two die operations.) Upon completion of the fourth die operation, the cartridge is removed and a new one inserted into the turret in its place. It will be appreciated that a complete cartridge is removed and a new cartridge is inserted after each pressing operation, i.e. there are four cartridges in the turret, each at a different stage of completion and going through the die stages in sequence.

Figure 5:
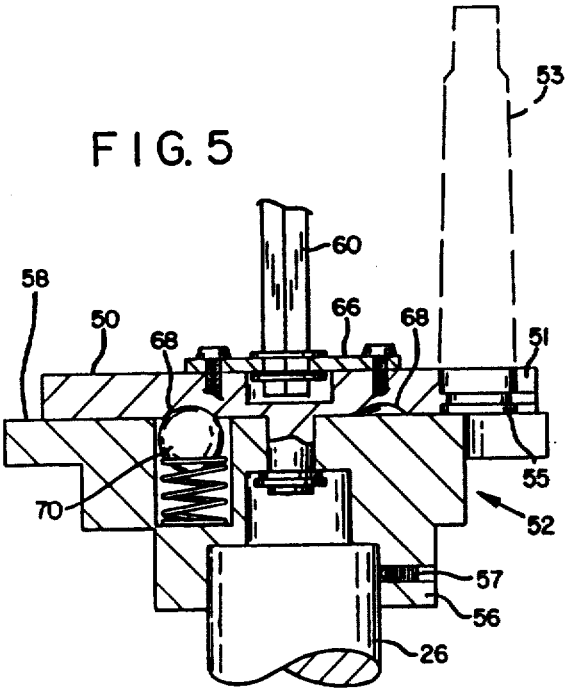
FIG. 5 illustrates the mounting mechanism, in sections, for mounting the indexing apparatus of FIG. 1.

The mounting mechanism 52 as particularly seen in FIG. 5 includes a collar 56 that is fixedly clamped to the top of the plunger 26 by a lock screw 57. A base plate 58 is integral with the collar 56 and these two components are non-rotatable relative to the plunger 26. The turret 50 is rotatably mounted to the base plate 58 and has configured U shaped cut outs 51 at four cartridge receiving positions. The U shaped cut outs 51 are designed for receiving the rims 55 of cartridges 53 which are slid into the cut outs of the turret for relative sliding over the upper surface of the base plate 58. The tubular casing that projects from the rim of the cartridge is nested in the U shaped cut out and projects upwardly from the turret. As the turret is rotated about its rotatable mounting to the base plate 58, the cartridges slide around the base plate 58 through the different die stations.

Projected upwardly from the turret 50 along the rotatable axis thereof is a shaft 60. The shaft is fixed to the turret 50 and accordingly rotates with the turret and vice versa. The shaft projects up through the holder 22 of the basic structure. More specifically, it projects through a bushing 63 that is seated in a center opening in the die holder portion 22. Rotation of the bushing is controlled in part by a one-way clutch mechanism 62. The opening in the die holder and thus the axis of the bushing 63 is located in the center of the circular pattern of dies 54.

The bushing 63 has an inner configuration that fits the cross section of the shaft 60 which, as illustrated, is a hexagon. The fit as between the shaft and the bushing is designed to allow vertical sliding of the shaft 60 through the bushing 63. The bushing material is preferably a low friction material such as polyethylene or it may be a ball type bushing such as that which is a component of a roller clutch bushing. An acceptable roller clutch bushing is available from The Torrington Company of Torrington, Conn. A specific roller clutch used in actual production of the device being identified by catalog No. RC-061008. In any event, the bushing is rotatable as permitted by the clutch in one direction and not in the other. Numerous types of mechanisms are available for performing this one-way clutch function and further description should not be not necessary.

Figure 4:
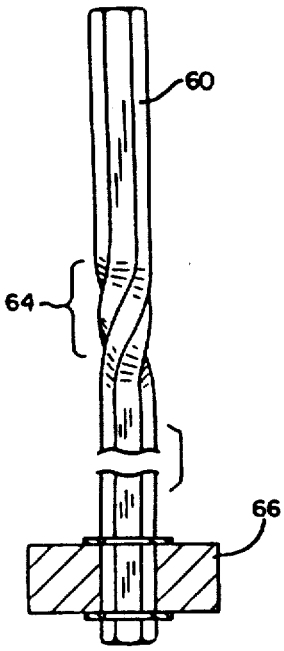
FIG. 4 is an enlarged side view of the indexing shaft removed from surrounding structure.

Referring to FIGS. 1 and 4, the hexagon cross section of the shaft 60 is twisted on the shaft in a section 64, near the top of the shaft. The angular offset of the twist is 90°, i.e. one-fourth of a complete turn of 360°. The shaft 60 is forced up and down through the bushing 63 (by operation of the handle 40 to force reciprocating moving of the plunger 26) and as the twist section 64 passes through the bushing 63, the bushing is urged to rotate a corresponding quarter turn relative to the shaft.

The arrangement of the twist on the shaft and the bushing is such that the bushing can turn within the one-way clutch mechanism 62 in the direction that is urged when the shaft 60 is forced upward through the die holder portion 22. The bushing is prevented from turning in the direction that is urged when the shaft is moved downwardly. Thus, in the downward stroke the shaft 60 has to turn. The turret is fixed to the shaft 60 by a bracket 66 as seen in FIG. 5, and thus turning of the shaft 60 turns the turret 50.

From FIG. 5, it will be seen that the underside of the turret 50 is provided with alignment detents 68. These detents are located at four positions around the turret. A spring urged ball 70 projected from the base plate 58, is aligned for seating in the detents 68 at each of the four positions whereat the cartridges in the turret 50 are aligned with the dies 54 in the die holder 22.

Turning of the turret 50 relative to the base plate 58 is resisted but not prevented by the spring urged ball 70 seated in a detent 68. This resistance is sufficient to force turning of the bushing 63 in the direction that is permitted by the one-way clutch mechanism 62. Thus, when the twist section 64 of the shaft 60 is forced upwardly through the bushing 63, the bushing turns and the shaft 60 and turret 50 do not turn. The spring urged bail 70 is readily unseated from detent 68 to permit turning of the shaft 60 and turret 50 when the twist section of the shaft is forced downwardly through the bushing. In this downward movement of the shaft 60, the bushing is prevented from turning.

THE ALTERNATE EMBODIMENT

Figure 6:
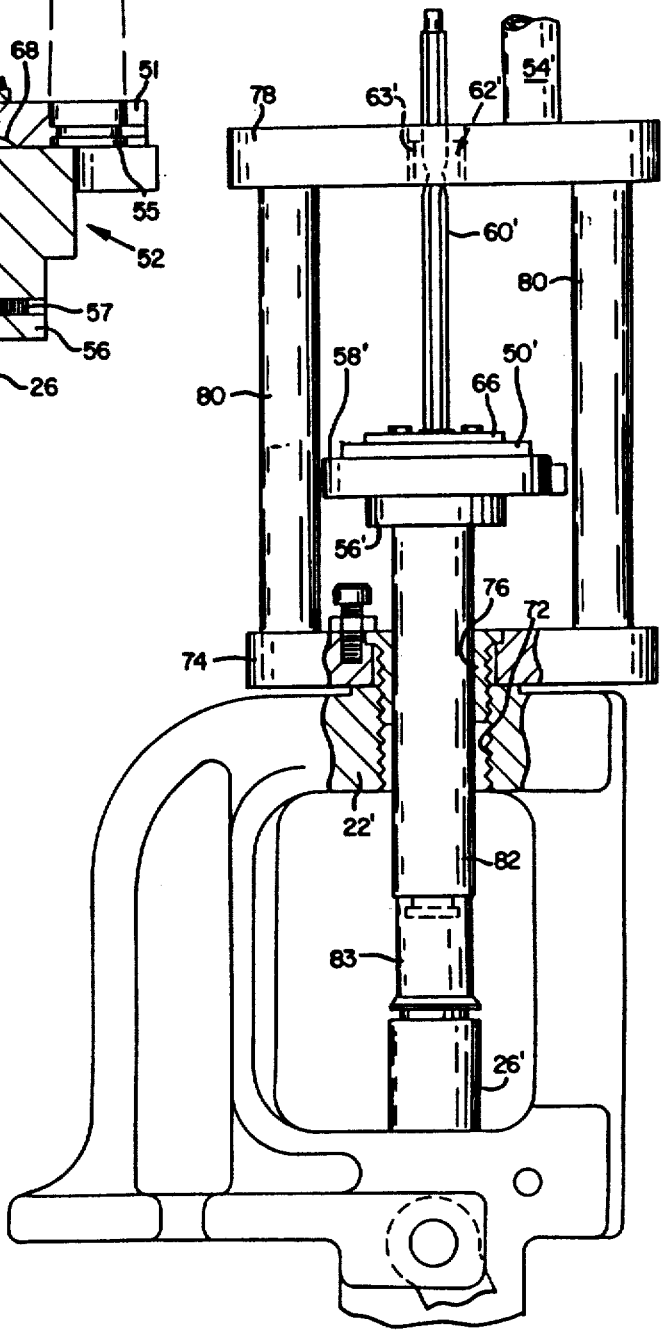
FIG. 6 is a side view of an alternate embodiment wherein the indexing apparatus is retrofit to a conventional single station reloader.

Reference is now made to FIGS. 6. The basic structure is designed for single station reloading. A center opening 72 in the die holder section 22' is adapted for receiving changeable dies. The plunger 26' is adapted to receive a cartridge holder aligned with opening 72 and thus with a die mounted in the opening 72. The operation of a single station reloading apparatus has been previously explained.

The objective of the invention as illustrated in FIG. 6 is to convert a conventional one-station reloaders to a multiple station reloader having features similar to that described for the embodiment of FIG. 1.

An adapter kit including the components for converting the one-station reloader includes a support plate 74 that is secured to the die holder plate 22' by a mounting nut 76 screwed through plate 74 and into the threaded die opening. A secondary die holder 78 is suspended over support plate 74 by posts 80. Similar to the die holder 22 of FIG. 1, die holder 78 has a center opening that contains a bushing and one-way clutch mechanism 62' and dies 54' arranged in a symmetrical circular pattern around the bushing.

A plunger extension 82 mounted to the plunger 26' via an adapter 83 is extended up through a center opening in the mounting unit 76. A turret 50', again similar to that of FIG. 1, is carried on a base plate 58' which is mounted through collar 56' to the plunger extension 82. A shaft 60' extends up from the turret through the bushing 63'. The turret is indexed relative to the base plate by the action of the shaft 60' forced through the bushing, all in the manner previously explained in FIG. 1.

Primarily this invention encompasses two major concepts. The basic concept is the manner of indexing a cartridge holding turret by a centrally mounted shaft that is forced through a bushing controlled in part by a one-way clutch mechanism. This arrangement permits the use of a centrally mounted plunger.

The center mounted plunger is adaptable through a retrofitting kit, for retrofitting conventional single station reloaders. The die holder accommodates the mounting nut for mounting the overhead structure including turret and secondary die holder. The mounting nut has a center opening to accommodate the plunger extension.

Numerous variations will become apparent to those skilled in the art without departing from these concepts. Such are encompassed by the invention as specifically defined in the claims appended hereto.

We claim:

1. A device for reloading cartridges comprising;

a support structure, an overhead die holder forming a part of the support structure for holding a plurality of cartridge reloading dies in a symmetrical pattern spaced around a center opening, a rotatable bushing positioned in said center opening and a one-way clutch mechanism permitting rotation of the bushing in one direction and preventing rotation thereof in the other direction, a plunger slidably mounted relative to the support structure for reciprocal vertical sliding movement from below the die holder toward the center opening therein, and actuating means for actuating said reciprocal movement of the plunger, a cartridge holding turret rotatably mounted to the top of the plunger for rotation thereof in a horizontal plane, and an indexing shaft fixedly attached to the turret and projected upwardly therefrom through the bushing, said shaft having a configured cross sectional portion and said bushing having a complimentary configuration to allow sliding movement of the shaft therethrough but prohibiting rotation relative to the bushing, the [configuration of the shaft] *configured cross sectional* portion being twisted [spiral] *spirally* around the shaft a determined angle along an indexing section of the shaft, said configured shaft portion and *said* indexing section thereof being arranged relative to the reciprocal plunger movement whereby the configured shaft portion and *said* indexing section are forced through the bushing during such *reciprocal* movement to force indexing rotative movement of the shaft and *said* turret by said determined angle of twist *while the plunger is moving* in the direction of reciprocating movement wherein the bushing is prevented from rotative movement by the one-way clutch mechanism.

2. A device as defined in claim 1 including alignment means that resists but does not prevent rotative turning of the cartridge holding turret at the position wherein the cartridges in the cartridge holding turret and the dies in the die holder are in alignment, said alignment means sufficiently resisting turning of the turret to force rotation of the bushing as permitted by the one-way clutch means.

3. A device as defined in claim 2 wherein the one-way clutch means permits turning of the bushing with the shaft pushed upwardly through the bushing whereby indexing of the turret occurs in a downward stroke of the shaft.

*4. A device as defined in claim 3 wherein the configured cross sectional* shaft [configuration] *portion* is a multi-*sided symmetrical polygon and* [the twist section thereof angularly displaces the polygon configuration by the same angle as exists between the reloader dies in the die holder] *wherein said reloading dies are angularly spaced apart around the center opening in the die holder to match the determined angle by which the configured cross sectional portion of the shaft is twisted spirally around the shaft.*

5. A kit for converting a single station cartridge reloader to a multiple station reloader, said single station reloader having a single cartridge holding plunger aligned vertically with a center opening of an overhead die holder adapted for receiving a reloading die, said kit comprising;

a retrofitting structure including a [base] *support* plate, a secondary overhead die holder having multiple die holder openings symmetrically arranged around a center opening, a rotatable bushing in the center opening *of the second die holder*, and a one-way clutch mechanism permitting rotative movement of the bushing in one direction and preventing rotative movement thereof in the other direction, and support members supporting the *secondary* die holder in overhead spaced relation to the [base] *support* plate, and mounting means for mounting the retrofitting structure to the overhead die holder of the single station reloader, a plunger extension and coupling means for coupling the extension axially of the plunger of the single station reloader whereby the extension is protruded through the center opening in the die holder *of the single station reloader*, a turret adapted to rotatably mount to the top of the plunger extension, and an indexing shaft fixed to the turret and extended from the rotative axis of the turret for vertical sliding movement of the [bushing] *shaft* through the *bushing in the* secondary overhead die holder, said shaft having a configured cross section and an indexing portion thereof being twisted spirally around the shaft a determined angle, said bushing *having a complementary configuration to allow said sliding and preventing rotation of said shaft relative to the bushing*, whereby reciprocal movement of the plunger extension produces sliding movement of the shaft through the bushing and indexing of the turret as dictated by the one-way clutch mechanism.

6. A kit as defined in claim [4] *5* wherein the mounting means is a mounting nut adapted to replace the die in the center opening of the single station reloader, said mounting nut mounting the [base] *support* plate of the retrofitting structure to the overhead die holder of the single station reloader, and said mounting nut having a center opening for permitting reciprocal movement of the plunger extension therethrough.

*7. A kit for converting a single station cartridge reloader to a multiple station reloader, said single station reloader having a single cartridge holding plunger aligned vertically with an opening of an overhead die holder adapted for receiving a reloading die, said kit comprising:*

*a support plate,*

*an overhead die holder member having a center position and multiple die positions symmetrically arranged around the center position,*

*support means supporting the die holder member in overhead spaced relation to the support plate,*

*mounting means for mounting the support plate to the overhead die holder of the single station reloader,*

*a plunger extension,*

*coupling means for coupling the plunger extension to the plunger of the single station reloader to be protruded through the opening in the die holder of the single station reloader,*

*a rotatable turret member mountable to the plunger extension, a center position on said rotatable turret member and multiple cartridge holding positions on said turret member symmetrically arranged around the center position of the turret member and corresponding in arrangement to the multiple die openings in the die holder member,*

*an indexing shaft extending between the center positions of said members, said shaft being axially fixed relative to one of said members, said shaft having a configured cross section and an indexing portion thereof twisted spirally around the shaft a determined angle,*

*a rotatable bushing mounted at the center position of the other of the members, and*

*a one-way clutch mechanism permitting rotative movement of the bushing in one direction and preventing said rotative movement in the other direction,*

*said bushing having an opening complementary to the configuration of said shaft through which said shaft extends to allow axial sliding of the shaft therethrough and preventing rotation of said shaft relative to the bushing, whereby reciprocal movement of the plunger extension produces sliding movement of the shaft through the bushing and indexing of the turret member as dictated by the one-way clutch mechanism.*

*8. A kit as defined in claim 7 wherein the opening of the overhead die holder of the single station reloader is internally threaded to normally receive an externally threaded die, said mounting means of the kit comprising an externally threaded mounting member secured to the support plate and extending into the threaded opening of the overhead die holder of the single station reloader for securing the support plate thereto, said mounting member having a center opening to receive and guide the reciprocal action of the plunger extension.*

*9. An assembly of a single station cartridge reloading structure and a conversion structure converting the single station cartridge reloading structure to a multiple station cartridge reloader;*

*said single station cartridge reloading structure comprising; a support, a plunger slidably mounted to said support for reciprocal up and down movement relative to the support, an overhead die holder fixedly mounted to the support, said overhead die holder having an opening for receiving a die and positioned in alignment with the plunger, said plunger adapted to support a cartridge and to move the cartridge into the die in the typical single station cartridge reloading operation,*

*said conversion structure comprising; a plunger extension coupled to the plunger, said plunger extension protruded through the overhead die holder opening, a turret rotatably mounted to the plunger extension to be reciprocated up and down with reciprocation of the plunger, a secondary die holder fixedly mounted to the single station cartridge reloader structure in spaced overhead relation to the turret, a plurality of cartridge holding stations on the turret arranged symmetrically around an upright axis, a corresponding plurality of die receiving stations on the secondary die holder similarly arranged around said upright axis, whereby cartridges placed in the cartridge receiving stations are aligned with dies positioned in the die receiving stations, and indexing means permitting indexing of the turret to successive rotative positions of alignment.*

*10. An assembly as defined in claim 9 wherein the conversion structure includes a secondary support supporting the secondary die holder in overhead spaced relationship, and a mounting member secured to the secondary support and threadably secured in the opening of the overhead assembly of the single station reloading structure, said*

*mounting member having a guide opening through which the plunger extension is slidably guided.*

*11. A kit for converting a single station cartridge reloader to a multiple station reloader, said single station reloader having a single cartridge holding plunger aligned vertically with a center opening of an overhead die holder adapted for receiving a reloading die, said kit comprising;*

*a plunger extension to be coupled to the plunger, with said plunger extension protruded through the overhead die holder opening, a turret mounted to the plunger extension to be reciprocated up and down with reciprocation of the plunger, a secondary die holder to be fixedly mounted to the single station cartridge reloader in spaced overhead relation to the turret, a plurality of cartridge holding stations on the turret arranged symmetrically around an upright axis, a corresponding plurality of die receiving stations on the secondary die holder similarly arranged around the upright axis, whereby cartridges placed in the cartridge receiving stations are aligned with dies positioned in the die receiving stations, and said turret is rotatable about said axis for indexing said cartridges relative to said dies positioned in said die receiving stations.*

*12. A kit as defined in claim 11 including a secondary support supporting the secondary die holder in overhead spaced relationship, and a mounting member secured to the secondary support and threadably secured in the opening of the overhead assembly of the single station reloading structure, said mounting member having a guide opening through which the plunger extension is slidably guided.*

*13. A kit as defined in claim 11 including indexing means responsve to reciprocation of the plunger extension for automatic indexing of the turret.*

* * * * *